No. 811,617. PATENTED FEB. 6, 1906.
W. & A. CHAMBERLAIN.
BRAKE FOR THE HUBS OF CYCLES.
APPLICATION FILED JULY 11, 1904.
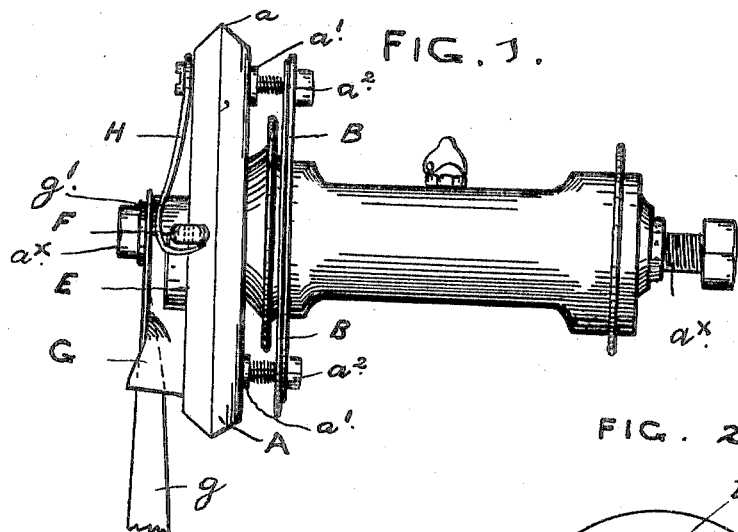
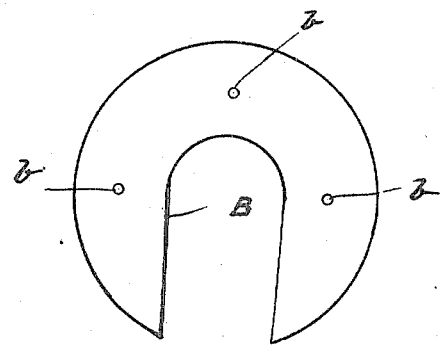
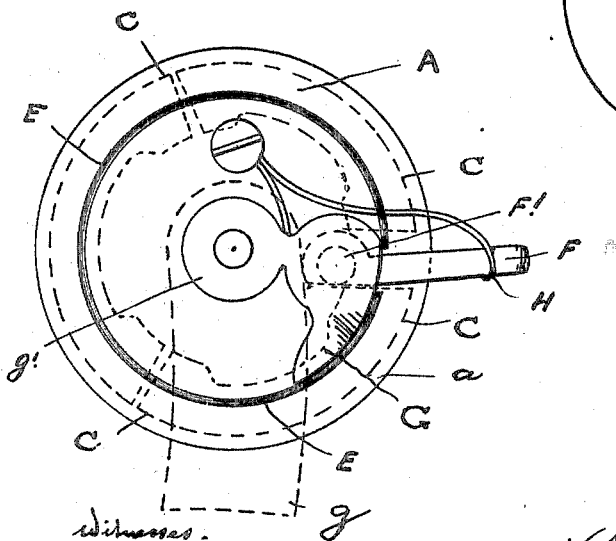

UNITED STATES PATENT OFFICE.

WILLIAM CHAMBERLAIN AND ARTHUR CHAMBERLAIN, OF WIGSTON MAGNA, ENGLAND.

BRAKE FOR THE HUBS OF CYCLES.

No. 811,617.      Specification of Letters Patent.      Patented Feb. 6, 1906.

Application filed July 11, 1904. Serial No. 216,157.

*To all whom it may concern:*

Be it known that we, WILLIAM CHAMBERLAIN and ARTHUR CHAMBERLAIN, subjects of His Britannic Majesty King Edward VII, residing at Spa Lane, Wigston Magna, in the county of Leicester, England, have invented new and useful Improvements in or Relating to Brakes for the Hubs of Cycles and the Like Manumotive or Power-Driven Machines or Vehicles, of which the following is a specification.

The object of this invention is to provide contrivances for or to be attached to wheel-hubs for braking the same and which can be produced at much less cost than those now in use, those to be attached not interfering with the spokes or other wheel-fittings.

That this invention may be clearly understood, drawings are annexed, in which—

Figure 4:
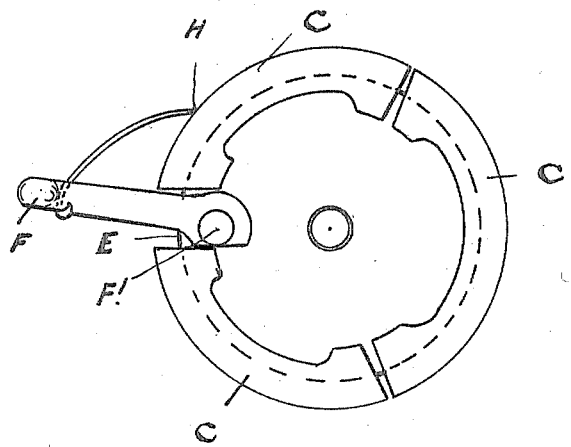

Figure 1, Sheet 1, is a side view of a front wheel-hub of a cycle with the brake contrivance attached thereto and to the wheel-spindle. Fig. 2, Sheet 1, is a view of one of the split washers employed in securing the contrivance to the flange of the wheel-hub by being passed over the barrel thereof. Fig. 3, Sheet 1, is a front view of the recessed or dished-out cup and outer cap or plate, the segmental brake-ring being shown in dotted line. Fig. 4, Sheet 2, is an inside view of the outer cap or plate, cam-lever, and the disposition of the segmental brake-ring; and Fig. 5 Sheet 2, a side view of the barrel and spoke-flanges and the recessed or dished-out brake-cup formed therewith.

Similar letters refer to similar parts throughout the several views.

Figure 5:
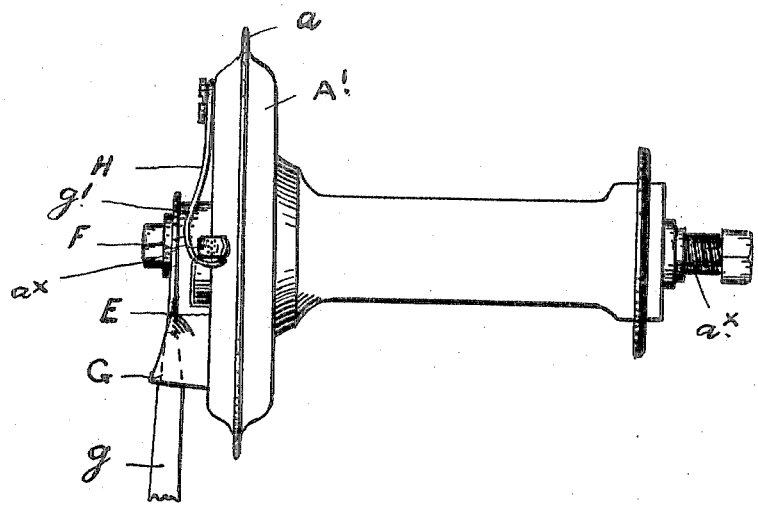

To carry out this invention of braking either the front or back wheel-hub of cycles and the like, we make a light, narrow, and solid recessed or dished-out cup or brake-box A, mounted on the hub-spindle $a^\times$ or formed, as seen in Fig. 5, Sheet 2, on the hub itself, or for large wheels the brake-drum A may be formed of two recessed or dished-out disks bolted together by its flanges $a$, as will be well understood, the cross-section of the brake-box being of a taper to correspond with the tapered outer edges of the brake-segments C, such being capable of retaining oil, which is of great advantage and with the outer cap or plate E renders the contrivance perfectly dust-proof. The back of such attachable brake-box A is provided with the lugs $a'$, into which are fitted the screws $a^2$, passing through the holes $b$ in the split washers or sectional fixing-plates B, which are placed over the barrel of the hub each in opposite directions inside the flange carrying the spokes of the wheel and secured thereon by nuts, as seen in Fig. 1, Sheet 1. The brake-segments C to form a ring are loosely arranged in the hollowed-out portion of the brake-shell, as seen in Figs. 3 and 4, and to effectually brake the wheel-hub they are all placed to bring them in contact with each other and impinge but not to lock against the tapered wall of the brake-shell A or A' by a very slight movement of the cam-lever F, the said brake-segments C being instantly separated or released upon the rider or driver letting go the hand or foot lever by the influence of the return-spring H, mounted on the circular outer or covering plate E, which is kept in position by the stop G engaging the fork $g$ of the frame of the machine. The outer end of the cam-lever F is bored out to receive the lower end of a spring-pressed rod, (not shown,) the upper end of which is connected to a hand-lever on the handle-bar, as is common in hand-operated brakes. The cam end of the lever F is mounted on the stud F', Figs. 3 and 4, inside the projecting bracket $g'$ of the outer covering-plate E and lies against one of the brake-segments C, the special feature of the cam being that one side is flat and the other round, the former for uniting the brake-segments C.

When the above-mentioned brake-shell is required for the back wheel-hubs, they are made correspondingly larger, the brake-segments in this case having a groove following the tapered edge to hold a spring-ring (not shown) and the stop G on the outer covering-plate E in such a position that it will catch against the backstay or in power-driven machines or vehicles against some projecting part thereof.

What we claim as our invention, and desire to secure by Letters Patent, is—

A hub hand-brake for the wheels of cycles and other manumotive or power-driven machines or vehicles comprising the following elements: a brake-shell A, lugs $a'$, sectional fixing-plates B and nuts $a^2$, loosely fitting brake-segments C, the tapered peripheries of which fit to the opposing portion of the brake-shell, a covering-plate E, the stud F', a cam-lever F carried by said stud, the said cam lying against one of the loose segments C, the outer end of the lever bored to carry a connecting-rod, a stop G, and a return-spring H, substantially as described.

In testimony whereof we have signed our names to this specification in the presence of two subscribing witnesses.

WILLIAM CHAMBERLAIN.
ARTHUR CHAMBERLAIN.

Witnesses:
  WALTER W. BALL,
  SAMUEL TOON.